United States Patent [19]
Roos et al.

[11] Patent Number: 5,497,442
[45] Date of Patent: Mar. 5, 1996

[54] ASSEMBLY FOR TRANSMITTING HIGH-POWER LASER RADIATION

[75] Inventors: Sven-Olov Roos, Hamburg; Reinhold Dinger, Glinde; Klaus Ludewigt, Oststeinbek, all of Germany

[73] Assignee: Rofin Sinar Laser GmbH, Hamburg, Germany

[21] Appl. No.: 293,734

[22] Filed: Aug. 19, 1994

Related U.S. Application Data

[63] Continuatin of PCT/EP93/00404, Feb. 19, 1993.

[30] Foreign Application Priority Data

Feb. 21, 1992 [DE] Germany ............................ 9202296 U

[51] Int. Cl.⁶ ...................................................... G02B 6/02
[52] U.S. Cl. ............................. 385/128; 385/12; 385/126
[58] Field of Search ........................... 385/128, 123–127, 385/12, 13; 65/445

[56] References Cited

U.S. PATENT DOCUMENTS

| | | | |
|---|---|---|---|
| 3,083,550 | 4/1963 | Averback | 385/456 |
| 4,407,561 | 10/1983 | Wysocki | 385/128 |
| 4,418,984 | 12/1983 | Wysocki et al. | 385/128 X |
| 4,889,400 | 12/1989 | Pinson | 385/128 |
| 4,893,895 | 1/1990 | Berthold et al. | 385/123 |
| 5,015,068 | 5/1991 | Petisce | 385/123 |

FOREIGN PATENT DOCUMENTS

| | | | |
|---|---|---|---|
| 0034670 | 9/1981 | European Pat. Off. | 385/128 |
| 0261484 | 3/1988 | European Pat. Off. | 385/128 |
| 0354452 | 2/1990 | European Pat. Off. | 385/128 |
| 2556786 | 7/1976 | Germany . | |
| 2527769 | 1/1977 | Germany | 385/128 |
| 2735079 | 3/1978 | Germany | 385/128 |
| 2704821 | 8/1978 | Germany . | |
| 2826010 | 1/1979 | Germany | 385/128 |
| 2125180 | 2/1984 | United Kingdom | 385/128 |
| 9117015 | 11/1991 | WIPO . | |

*Primary Examiner*—John D. Lee
*Assistant Examiner*—Phan T. H. Palmer
*Attorney, Agent, or Firm*—Herbert L. Lerner; Laurence A. Greenberg

[57] ABSTRACT

An optical fiber for high-power laser transmission is formed of a glass fiber with a fiber core and a fiber cladding surrounding the fiber core. An intermediate layer of polymer is disposed on the fiber cladding, a metallic coating of film is disposed on the intermediate layer, and the metallic coating is protected against mechanically induced damage with an outer jacket. The operational condition of the optical fiber is monitored in that the electrical resistance across the metallic coating is measured along the optical fiber. When the resistance exceeds a predetermined threshold value, the laser radiation is prevented from entering the optical fiber, preferably with a shutter.

9 Claims, 1 Drawing Sheet

ASSEMBLY FOR TRANSMITTING HIGH-POWER LASER RADIATION

CROSS-REFERENCE TO RELATED APPLICATION

This application is a continuation of international application Ser. No. PCT/EP93/00404, filed Feb. 19, 1993, and designating the United States.

BACKGROUND OF THE INVENTION

1. Field of the Invention

The invention relates to a device for the transmission of high-power laser radiation.

Among others, the laser radiation emitted by Nd:YAG lasers in the optical wavelength range is used for machining materials with high-power laser radiation, for example for cutting and welding. One of the advantages gained from the use of a Nd:YAG laser lies in the fact that the laser beam can be transmitted to the work piece by an optical fiber.

Damage to the optical fiber, for example a rupture caused by an excessive or frequently repeated bending stress, poses a danger that a portion of the laser beam escapes or is diverted from the optical fiber into the environment, where it causes damage. It is therefore important to continuously monitor the condition of the optical fiber and to shut off or to divert the laser beam immediately upon detecting a fault. In other words, the beam must be prevented from entering into the optical fiber if a fault is detected.

2. Description of the Related Art

A plurality of devices and procedures are known to the art which are based on optics and serve the purpose of monitoring the condition of an optical fiber disposed in an optical transmission path. From WO 91/17015, for example, a device is known in which, in addition to the high-energy laser light, a light with a different wavelength is coupled into the optical fiber. That light is reflected at the end of the transmission length and received by a receiver device located near the laser. In the case of a rupture of the optical fiber, the intensity of the reflected light received by the receiver device is diminished and leads to a shutoff or dimming of the energy-rich laser light. That device, however, is relatively costly and cost intensive because of the required additional optical components.

It is also known to monitor the condition of an optical fiber by equipping the peripheral surface thereof with a metal wire inserted between the optical fiber and a cable cladding placed over the optical fiber. This is based on the premise that, if the optical fiber ruptures, then the metal wire will break as well. The breaking of the metal wire can be detected via electrical resistance measurement. It has become evident, however, that a partial or complete rupture of the optical fiber does not in all cases lead to the breakage of the metal wire. Monitoring of the electrical resistance of the metal wire, therefore, does not offer reliable information with regard to the condition of the optical fiber.

Optical fibers for optical information transmission are known from German published, non-prosecuted application DE-A1-25 27 769. A metal coating is applied directly onto the glass fiber. The metal coating is applied directly after the manufacture of the glass fiber and simultaneously serves as protective layer for the glass fiber in the later application of a synthetic cladding. The metal coating serves predominantly as protection of the glass fiber against humidity. Another advantage mentioned in the context of that prior art optical fiber is the fact that the metal coating also makes an electrical measurement of a fault location in the optical fiber possible.

Optical waveguide fibers in which a metallic coating is applied directly onto the glass cladding for protecting the interior glass fiber, are also known, for example, from U.S. Pat. Nos. 3,083,550 and 4,893,895, and from German patent applications Nos. 2 556 786; 2 735 079; 2 704 821; and 2 826 010. The art has also proposed to use the metallic protective coating in the transmission of useful electrical signals. These prior art optical fibers thus are well suited for monitoring the glass fiber for ruptures due to their metallic coating, but particularly with applications in which the optical fiber is subjected to constantly changing bending stresses, i.e. particularly for guiding laser beams to a moving tool head for machining a work piece, it has become clear that the optical fibers coated with a metallic material are clearly less resistant to rupture than the optical fibers known, for example, from U.S. Pat. No. 5,015,068, which do not contain a metallic coating between the glass fiber and a synthetic protective layer.

The prior art optical fibers with metallic coating are, therefore, well suited for monitoring for rupture, but their use is only possible with cables in fixed locations which are not subjected to constantly changing bending stresses.

It is accordingly an object of the invention to provide an optical fiber the condition of which can be easily and securely monitored and which ensures long service life even with frequent bending stress.

SUMMARY OF THE INVENTION

With the foregoing and other objects in view, there is provided, in accordance with the invention, an assembly for transmitting high-power laser radiation, comprising:

an optical fiber formed of a glass fiber with a fiber core and a fiber cladding surrounding the fiber core, an intermediate layer of polymer disposed on and surrounding the fiber cladding, a metallic coating disposed on the intermediate layer, and protective means for protecting the metallic coating against mechanical destruction; and monitoring means connected to the metallic coating of the optical fiber for measuring an electrical resistance of the metallic coating for monitoring an operational condition of the optical fiber.

In accordance with an added feature of the invention, the intermediate layer is formed of an auxiliary layer covering the fiber cladding and a protective coating covering the auxiliary layer. Preferably, the auxiliary layer is made of a relatively soft polymer, and the protective coating is made of a relatively harder polymer, the protective coating having a modulus of elasticity greater than a modulus of elasticity of the auxiliary layer.

In other words the objects of the invention are solved with a structure which may be described as follows:

a) a glass fiber with a fiber core and a fiber cladding;

b) at least one intermediate layer made of polymer which is deposited on the fiber cladding;

c) a metallic coating applied onto the intermediate layer; and d) means for protecting the metallic coating from a mechanical destruction caused by abrasive friction; as well as e) means for measuring the electrical resistance of the metallic coating. Due to the fact that the intermediate layer of the optical fiber is equipped with a thin metallic coating, each excessive bending stress or each rupture of the fiber core also leads to an—at least partial—destruction of this metallic coating. This destruction can then be detected via electrical resistance measurements. Since, in addition, the metallic coating is applied onto an intermediate layer formed of a polymer material, the resistance to fracture is clearly higher than in an optical fiber in which the metallic coating is applied directly on the glass fiber.

The laser radiation emanating from the fiber core and the fiber cladding is absorbed in the intermediate layer located between the fiber cladding and the metallic coating and already with slight damage in the glass fiber generates a local heating effect which leads to a partial destruction of the metallic coating even when the mechanical strain of the optical fiber caused by a bending stress has not yet lead to a rupture or a tear in the metallic coating.

In accordance with an additional feature of the invention, the protective means include a protective layer disposed on the metallic coating for protecting the metallic coating.

In accordance with another feature of the invention, the metallic coating has a thickness of between 0.1 µm and 5 µm, and preferably 0.4 µm.

In accordance with yet a further feature of the invention, the assembly further comprises a protective device operatively connected to the monitoring means to be actuated when the electrical resistance of the metallic coating exceeds a predetermined threshold value. Preferably, the protective device includes a shutter which can be brought into the path of the laser beam and which prevents the laser beam from entering the optical fiber.

With the above and other objects in view there is further provided, in accordance with the invention, a method of monitoring an operational condition of an optical fiber for transmitting high-power laser radiation, the optical fiber being of the type in which a glass fiber formed with a fiber core and a fiber cladding is encased with an intermediate layer made of polymer, and wherein a metallic coating is disposed on the intermediate layer, and protective means are disposed on the metallic coating for protecting the metallic coating against mechanical abrasion, the method which comprises: connecting mutually spaced-apart ends of the metallic coating to electrical resistance measuring means; measuring an electrical resistance across the metallic coating; and concluding that the optical fiber is damaged when the electrical resistance across the metallic coating exceeds a predetermined threshold resistance.

Optical fibers are known from U.S. Pat. No. 4,889,400 with a metallic coating applied onto a synthetic protective coating enveloping the glass fiber. That prior art optical fiber, however, was conceived for a purpose which is different from that of the instantly disclosed invention. The metallic coating has the function of protecting the glass fiber from destruction caused by laser beam effects coming from the outside. For this purpose, the outer cladding of the optical fiber has to be covered by a reflective coating. An optical fiber of this kind, however, is not suited for applications involving light transmission between a laser and a tool head, e.g. a welding head, since it cannot withstand the mechanical strain affecting it from the outside.

The embodiment of the invention in which the intermediate layer is formed of two polymer layers with a different moduli of elasticity, provide the optical fiber with superb protection against damage caused by so-called micro-bending. Other features which are considered as characteristic for the invention are set forth in the appended claims.

Although the invention is illustrated and described herein as embodied in an assembly for transmitting high-power laser radiation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
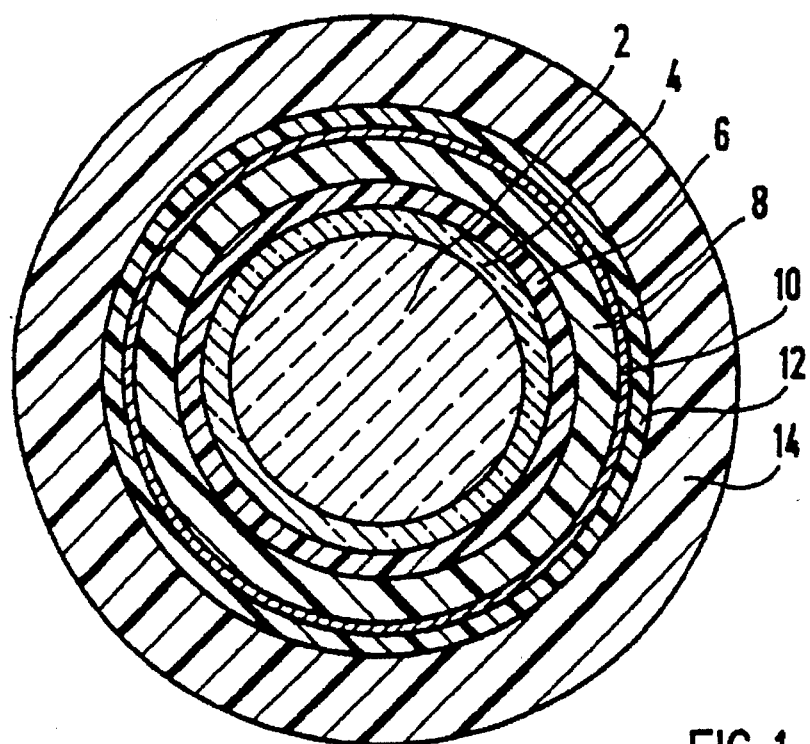
FIG. 1 is a cross-sectional view of a preferred embodiment of an optical fiber.

Referring now to the figures of the drawing in detail, and first, particularly, to FIG. 1 thereof, an optical fiber according to the invention includes a quartz glass fiber consisting of a fiber core 2 and a fiber cladding 4 enveloping the core 2. The refraction indices of the fiber core 2 and the fiber cladding 4 are adjusted in such a way that the light spreading within the fiber core 2 is totally reflected at the boundary interface with the fiber cladding 4 (step-index fiber) or it is diffracted away from the interface within the fiber core 2 (gradient-index fiber) and does not leave the fiber core 2. Typical values for the diameter of the fiber core 2 of a multi-mode fiber used are 200 µm–1,000 µm. The thickness of the fiber cladding 4 then amounts to approximately 20 µm–200 µm.

The fiber cladding 4 is equipped with an auxiliary layer or buffer layer 6 made of synthetic material. The auxiliary layer 6 is covered by a protective coating 8, which also consists of plastic material. The auxiliary layer or buffer 6 is preferably formed of a soft polymer with a low modulus of elasticity, for example a silicon-based polymer, in order to protect the glass fiber against micro-bending.

The essential purpose of the protective layer 8 is to mechanically protect the optical fiber and to increase its resistance and longitudinal stiffness. For this, polymer materials with a higher modulus of elasticity than that of the buffer 6 are suitable, for instance as polyamide. Optical waveguide fibers constructed in this manner can be coated by the firms Fiber Guide Industries or Ceram Optec GmbH, for instance.

According to the invention, a thin metallic layer 10 is deposited on the protective layer 8. The layer 10 concentrically encloses the fiber core 2 and it is used to monitor the condition of the optical fiber. In the embodiment shown in the figure, the metallic coating 10 is itself protected against mechanical abrasive friction by means of an additional protective layer 12, for example, made of a UV-hardened adhesive (Vitralit 6172 or Pearl-Paint-Lacquer).

The metallic coating 10 preferably has a thickness of between 0.1 µm and 5 µm, in particular a thickness of approximately 0.4 µm. It can be deposited on the protective layer 8 lying underneath by means of, for example, vapor deposition (vapor metal-coat deposition). Suitable metals are, for example, gold (Au), silver (Ag), and particularly aluminum (Al). In order to produce good adhesion of the metallic coating 10 on the protective layer 8, it is appropriate to subject the fiber to an electrical discharge for activating its surface before the metal-coat vaporization.

In the case of a slight damage caused by bending stress in the area of the fiber core 2 or the fiber cladding 4, the radiation leaking from the fiber cladding 4 is absorbed in the protective layer 8. In the protective layer 8 the escaping radiation causes a pronounced local heating effect which, in turn, leads to the destruction of the thin metallic coating 10. Experiments have shown that within as little as one millisecond after the fracture of the glass fiber, the metal coating 10, as well, is measurably damaged. Due to the heating effect, the metal coating 10 disintegrates in the area of the fracture into small separated islands with diameters of approximately 10 µm. Experiments have also shown that a complete metal coating about the entire circumference is not absolutely necessary. In most cases, a partial coating of the circumference of the protective layer 8 has proven to be sufficient. This occurs, for example, when the optical fiber is subjected to vapor deposition while it is wound on a cylindrical roll in a single layer. That portion of the fiber which faces the roll surface is not coated and it remains exposed with regard to the metallic layer.

The thickness of the auxiliary layer 6 and the protective coating 8 here must not be too great, in order to ensure a destruction of the metallic coating even with slight damage of the glass fiber. Thicknesses of approximately 50 µm each have proven to be advantageous.

The optical fiber in the figure is, in addition, built into a cable cladding or cable jacket 14. The cladding 14 consists, for example, of PVC which offers additional optical protection in the case of a rupture of the fiber and which protects the metallic coating 10 against frictional rub-off or scratching, even in an embodiment without a directly applied protective coating 12.

Figure 2:
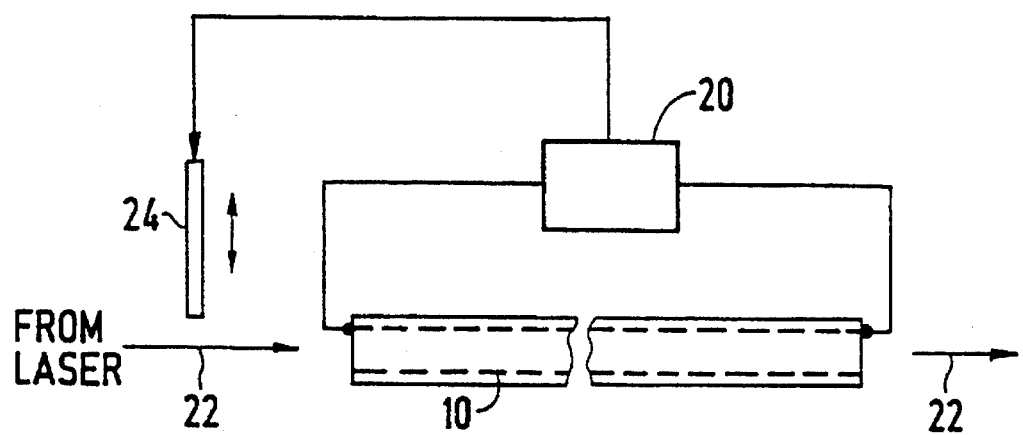
FIG. 2 is a schematic illustration of an assembly according to the invention.

Referring now to FIG. 2, the optical fiber is preferably monitored with a device 20. The device 20 includes means for measuring the electrical resistance of the metallic coating 10 extending over the entire length of the optical fiber. Sectional measurements, in which portions of the fiber cable can be individually monitored, are envisioned as well. The device 20 also has means for actuating a shutter 24 located in the beam path of the laser beam 22 before its entry into the optical fiber. When the resistance across the coating 10 exceeds a specified threshold value, the shutter 24 is actuated and the laser beam 22 is prevented from entering the optical waveguide.

We claim:

1. Assembly for transmitting high-power laser radiation, comprising:
    an optical fiber formed of a glass fiber with a fiber core and a fiber cladding surrounding said fiber core, an intermediate layer of polymer disposed on and surrounding said fiber cladding, a metallic coating disposed on said intermediate layer, and protective means for protecting said metallic coating against mechanical destruction; and
    monitoring means connected to said metallic coating of said optical fiber for measuring an electrical resistance of said metallic coating for monitoring an operational condition of said optical fiber.

2. The assembly according to claim 1, wherein said intermediate layer is formed of an auxiliary layer covering said fiber cladding and a protective coating covering said auxiliary layer.

3. The assembly according to claim 1, wherein said auxiliary layer is made of a relatively soft polymer, and said protective coating is made of a relatively harder polymer, said protective coating having a modulus of elasticity greater than a modulus of elasticity of said auxiliary layer.

4. The assembly according to claim 1, wherein said protective means include a protective layer disposed on said metallic coating for protecting said metallic coating.

5. The assembly according to claim 1, wherein said metallic coating has a thickness of between 0.1 µm and 5.0 µm.

6. The assembly according to claim 1, which further comprises a protective device operatively connected to said monitoring means to be actuated when the electrical resistance of said metallic coating exceeds a predetermined threshold value.

7. The assembly according to claim 6, wherein said optical fiber has a side at which a laser beam enters into said optical fiber for transmission thereof, and said protective device includes a shutter which can be brought into the path of the laser beam for preventing the laser beam from entering said optical fiber.

8. A method of monitoring an operational condition of an optical fiber for transmitting high-power laser radiation, the optical fiber being of the type in which a glass fiber formed with a fiber core and a fiber cladding is encased with an intermediate layer made of polymer, and wherein a metallic coating is disposed on the intermediate layer, and protective means are disposed on the metallic coating for protecting the metallic coating against mechanical abrasion, the method which comprises:
    connecting mutually spaced-apart ends of the metallic coating to electrical resistance measuring means;
    measuring an electrical resistance across the metallic coating; and
    concluding that the optical fiber is damaged when the electrical resistance across the metallic coating exceeds a predetermined threshold resistance.

9. Assembly for transmitting high-power laser radiation, comprising:
    an optical fiber formed of a glass fiber with a fiber core and a fiber cladding surrounding said fiber core, an intermediate layer of polymer disposed on and surrounding said fiber cladding, a metallic coating disposed on said intermediate layer, and a protector protecting said metallic coating against mechanical destruction; and
    a monitor connected to said metallic coating of said optical fiber, said monitor measuring an electrical resistance of said metallic coating for monitoring an operational condition of said optical fiber.

* * * * *